United States Patent [19]

Debus et al.

[11] 4,137,088

[45] Jan. 30, 1979

[54] PLASTICIZER COMBINATION FOR BUILDING MATERIALS

[75] Inventors: Gerhard Debus, Assmannshausen; Volker Knittel, Wiesbaden, both of Germany

[73] Assignee: Hoechst Aktiengesellschaft, Germany

[21] Appl. No.: 874,699

[22] Filed: Feb. 2, 1978

[30] Foreign Application Priority Data

Feb. 7, 1977 [DE] Fed. Rep. of Germany ....... 2704929

[51] Int. Cl.² .................................................. C04B 7/35
[52] U.S. Cl. ........................................ 106/90; 106/109; 106/110; 106/111; 106/118; 106/121; 106/314

[58] Field of Search ................. 106/90, 314, 109, 110, 106/111, 118, 121

[56] References Cited

U.S. PATENT DOCUMENTS

| | | | |
|---|---|---|---|
| 3,686,133 | 8/1972 | Hattori et al. | 106/314 |
| 3,769,051 | 10/1973 | Hardin | 106/90 |

*Primary Examiner*—James Poer
*Attorney, Agent, or Firm*—James E. Bryan

[57] ABSTRACT

This invention relates to an additive combination, for water-containing, setting building materials, in particular those of cement, based on an anionic polyelectrolyte, and including at least one nonionic, low-foaming surfactant. The invention also relates to a process for plasticizing water-containing, setting building materials.

8 Claims, No Drawings

PLASTICIZER COMBINATION FOR BUILDING MATERIALS

This invention relates to an additive combination for the plasticizing of water-containing, setting building materials, in particular those of cement, and to a process for the plasticizing of these building materials.

Additives, having a plasticizing action, of this type are used, for example, for cement mortar or concrete for the purpose of either obtaining an improved flowability in a mortar or concrete with an additive, as compared with a mortar or concrete of the same type without an additive, the amount of water added being the same, or of saving water in a mortar or concrete with an additive, the consistency thereof remaining the same, and thus achieving an increase in strength.

Numerous chemical additives therefore are already known, with the aid of which attempts are made to influence the working properties, for example the flow behavior, of building materials; these include, inter alia, anionic dispersing agents, such as alkylaryl sulfonates, ethylene oxide addition products, alkylphenyl polyglycol ethers and lignin sulfonates, but especially higher molecular weight anionic condensation products of optionally substituted aromatic hydrocarbons or aromatic heterocyclic compounds with aldehydes.

DT-OS No. 1,745,441, describes a process for preparing solutions of melamine (= 2,4,6-triamino-1,3,5-triazine)/formaldehyde resins modified with sulfite; the products of the process are intended to shorten the working time of mixtures of building materials, i.e. the time difference between the initial set and the end of set.

DT-OS No. 1,941,576, discloses a mortar which is based on anhydrite or cement and contains an addition of a melamine/formaldehyde resin modified with sulfite or sulfonic acid and a condensation product of naphthalene sulfonic acid and formaldehyde. This additive is intended to assist the formation of a smooth, dense and solid surface of the mortar and hence to counteract a formation of bubbles and a segregation of water on the surface.

The additive for hydraulic cement mixtures, according to DT-OS No. 2,007,603, is composed of a salt of a high molecular weight condensation product of naphthalene sulfonic acid with formaldehyde and a salt of gluconic acid. It has the purpose of obtaining an easily dispersible hydraulic cement mixture for the preparation of solid, readily workable cement, mortar, concrete or rendering while reducing the amount of mix water required without the addition.

DT-OS No. 2,322,707, describes a mortar which, in addition to the customary inorganic binders, also contains condensation products of formaldehyde with sulfonated aromatic ethers and/or amines and/or sulfones. The added condensation products exert a wetting or plasticizing effect on the mortar, without causing a tendency of the material prepared in this way to "bleeding", i.e., segregation of a part of the mix water.

DT-OS No. 2,436,603, discloses an additive for plasticizing concrete and mortar, which is composed of sulfated dextrin and does not lead to an effect which retards setting.

The auxiliary for improving the mechanical characteristic data, which are important during and/or after working, of water-containing setting inorganic building materials, according to DT-OS No. 2,421,222, contains a condensation product of a dinuclear sulfonated phenol with formaldehyde. It improves, in particular, the flowability of building materials.

DT-OS No. 2,602,408, describes a process for the preparation of thin layers of hardened Portland cement mortar under ambient conditions of relative humidity, wherein 5 to 15% by weight, relative to the cement weight, of an anionic dispersing agent are added to the mortar. The anionic dispersing agents used are salts of alkylaryl sulfonic acid, ligno sulfonic acid and alkoxy sulfonic acid, and particularly the sodium salt of a condensation product of naphthalene sulfonic acid and formaldehyde. This process is intended above all to effect excellent adhesion of layers on wood and also to be employed in the field of repairs and renewal of surfaces.

However, various, frequently troublesome disadvantages of the plasticizers, forming part of the state of the art, for building materials have been disclosed. For example, in the case of anionic dispersing agents having a relatively small plasticizing effect, a certain reduction of the setting rate and an increase in the air space ratio have been found. On the other hand, in the case of the higher molecular weight, anionic condensation products having a relatively better plasticizing action, settling phenomena occur which can lead, for example, to the so-called "bleeding out", i.e. segregation of a part of the mix water, or to a finished product with sections of differing density.

It is thus the object of the present invention to provide an additive for water-containing, setting building materials in the form of an additive combination which entails no settling, or only a slight settling, of the mixture of building material, while having a good plasticizing action.

The starting point for the invention is an additive for water-containing, setting building materials, in particular those of cement, which additive is based on an anionic polyelectrolyte. The additive according to the invention is an additive combination which comprises at least one non-ionic, low-foaming surfactant.

A preferred embodiment of the additive combination contains, in addition, at least one polyhydroxy monocarboxylic or polyhydroxy dicarboxylic acid.

The term water-containing, setting building materials is to be understood as mixtures (before setting) of a binder, fillers and additives, water and optionally an auxiliary. Binders customarily are cement, lime, gypsum, burned magnesite or mixtures of two or more thereof; according to the invention, the binder employed preferably is cement. As a rule, granular inorganic substances are used as fillers and additives, for example fine-grain to coarse-grain sand, silicates based on stone dust or blast furnace slags, limestone dust, kaolin, kieselguhr, perlite, pumice or foamed small plastic beads. Auxiliaries include, inter alia, air-entraining agents, setting retarders or accelerators, agents imparting thixotropy, anti-freeze mixtures or agents which increase the imperviousness to water; these auxiliaries are advantageous for certain fields of application (for example light-weight concrete or thin layers of mortar) of the water-containing, setting building materials.

In some fields of application, even the use of fillers or additives is omitted; this applies particularly to building materials of gypsum or anhydrite.

Anionic polyelectrolytes are macromolecules with incorporated ionizing constituents, the charge of which is negative. According to the invention, the anionic polyelectrolytes include anionic higher molecular dispersing agents, in particular higher molecular weight, anionic condensation products of optionally substituted aromatic hydrocarbons or aromatic heterocyclic compounds with aldehydes, such as melamine/formaldehyde resins modified with sulfite or sulfonic acid, sulfonated naphthalene/formaldehyde resins or condensation products of dinuclear sulfonated phenols with formaldehyde, the dinuclear phenols being either bonded directly or being bridged by a sulfone, sulfoxide, sulfide, methylene, dimethyl-methylene (propan-2,2-yl) or carbonyl group.

Advantageously, about 0.1% by weight to 3.0% by weight, relative to the binder in the building material, of the anionic polyelectrolytes are added.

The non-ionic, low-foaming surfactants, used according to the invention, are in particular those which contain a proportion of hydrophobic groups greater than that of hydrophilic groups. Preferentially, these include pure block polymers of propylene oxide and ethylene oxide with a high content of propylene oxide and a low content of ethylene oxide, modified block polymers based on ethylene oxide and propylene oxide or reaction products of alkylphenols (for example nonylphenol) with a small number of ethylene oxide molecules (alkylaryl polyglycol ethers). The following are examples of non-ionic, low-foaming surfactants which can be used according to the invention:

Block polymer of 90% of propylene oxide and 10% of ethylene oxide (®Genapol PF 10), block polymer of ethylene diamine, ethylene oxide and propylene oxide (®Genapol PN 30), block polymer of a fatty alcohol, ethylene oxide and propylene oxide (®Genapol PL 44) and a nonylphenol polyglycol ether of nonylphenol and 4 moles of ethylene oxide (®Arkopal N-040). The trademarks indicated are registered trademarks of Hoechst AG; block polymers of similar structure are also marketed, for example under the trademarks ®Pluriol PE 6100, ®Pluronic L 61, ®Tetronic 701, ®Plurafac (from BASF) and ®Tritron CS 76 (from Rohm and Haas, USA) and alkylaryl polyglycol ethers of similar structure are marketed under the trademarks ®Autorax CO (from GAF, USA), ®Lutensol A (from BASF) and ®Marlophen (from Chemische Werke Huls AG).

Advantageously, about 0.05% by weight to 1.0% by weight, relative to the binder in the building material, of the non-ionic, low-foaming surfactants is added.

The polyhydroxy monocarboxylic or polyhydroxy dicarboxylic acids contained in a preferred embodiment of the additive combination in addition to the non-ionic, low-foaming surfactants, are in particular those which are represented by one of the two formulae

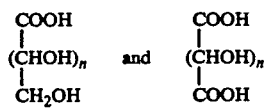

or corresponding salts thereof, wherein n denotes an integer from 2 to 5. Examples of compounds of this type are tetronic, pentonic, hexonic and heptonic acids and the tetraric, pentaric, hexaric and heptaric acids and their corresponding salts, in particular tartaric acid, and tartrates, D-gluconic acid, D-gluconates, heptonic acid and the heptonates.

Among the last mentioned type of compounds, about 0.01% by weight to 0.5% by weight, relative to the binder in the building material, are advantageously added. Their addition entails a synergistic plasticizing action which substantially exceeds a purely additive effect.

Compared with the additives known from the state of the art (see also the comparative examples below), the additive combination according to the invention has various advantages. For example, when the non-ionic, low-foaming surfactants are added to the anionic polyelectrolytes known to have a plasticizing action, the tendency to settling, which can be observed when they are used alone, no longer occurs, or occurs only to a lesser extent, without the plasticizing action being decreased. Furthermore, it is possible to achieve a synergistic plasticizing effect, which exceeds a purely additive action, by a further addition of polyhydroxy monocarboxylic or polyhydroxy dicarboxylic acids. For example, if the amount employed of the relatively expensive anionic polyelectrolytes is reduced in this way, an equivalent or even better plasticizing effect is achieved with no settling tendency, or only a slight settling tendency occurring.

The percent data listed in the examples are - unless otherwise stated - always percent by weight. The measured values listed in the examples were determined using the following building materials and by means of the following measuring methods:

PLASTICIZING ACTION

As a measure of the plasticizing action, the slump of the building material - with and without the additive - in cm is determined on the vibratory table in accordance with DIN 1,164 (1958 edition).

AIR SPACE RATIO

The air space ratio is quoted in % by volume and determined using the air space ratio tester (1 l pressure vessel) of the Tonindustrie (clay industry) design.

BENDING TENSION STRENGTH AND COMPRESSIVE STRENGTH

These values are determined in accordance with DIN 1,164 (1970 edition, sheet 7) after a storage period of 28 days and are quoted in kp/cm$^2$.

For the two first measurements, a building material of the following composition was used - with or without the additive(s) indicated in the examples:

50 parts by weight of 350 F Portland cement
50 parts by weight of standard sand I
100 parts by weight of standard sand II
25 parts by weight of water.

To determine the bending tension strength and the compressive strength the following building material was employed:

45 parts by weight of 350 F Portland cement
135 parts by weight of standard sand mix
22.5 parts by weight of water.

In both cases, the water/cement value was 0.5 and the mixes were made up using the mixture according to DIN 1,164 (1970 edition, sheet 7). The water/cement value of 0.5 was selected in order to be able to carry out a test series representative of, for example, flowable concrete or flowable screed.

The settling tendency was determined visually in accordance with comparative criteria in 3 categories: moderate, medium and high.

COMPARATIVE EXAMPLES V 1 TO V 5

V 1: Building material without an added auxiliary (plasticizer).

V 2: Building material with the addition of a sulfonated condensation product of a dihydroxy-diphenyl sulfone and formaldehyde.

V 3: Building material with the addition of a sulfonated condensation product of melamine and formaldehyde.

V 4: Building material with the addition of a sulfonated condensation product of naphthalene and formaldehyde, more than 70% consisting of those molecules which have 7 or more naphthalene groups.

V 5: Building material with the addition of a mixture of 50% of a condensation product of naphthalene, β-naphthalene sulfonic acid and formaldehyde and 50% of $Na_2SO_4$.

The measured values obtained can be seen from Table I.

EXAMPLES 1 TO 4 (TABLE II)

A building material is prepared with an additive combination composed of a sulfonated condensation product of a dihydroxydiphenyl sulfone and formaldehyde (additive 1) and a block polymer of ethylene diamine, ethylene oxide and propylene oxide (additive 2), the amounts added being varied. It is found that the additive 2 effects a marked reduction in the settling tendency, without the air space ratio rising significantly. If a smaller amount of additive 1 is employed, an increase in the plasticizing action occurs with the aid of additive 2, which action remains approximately constant even if the amount of additive 2 decreases (see V 2).

EXAMPLES 5 AND 6 (TABLE II)

A building material is prepared with the additive combination composed of the additive 1 according to Examples 1 to 4 and Na-D-gluconate (additive 2), the amount of additive 2 being varied. It is found that the additive 2 effects a marked reduction in the settling tendency, the air space ratio being diminished. Furthermore, compared with a building material without additive 2, but with additive 1, an increase in the plasticizing action occurs, which is only slightly reduced as the amount of additive 2 decreases (see V 2).

EXAMPLE 7 (TABLE II)

A building material is prepared with the additive combination composed of a sulfonated condensation product of melamine and formaldehyde (additive 1) and of additive 2 according to Examples 1 to 4. It is found that the additive 2 effects a reduction of the settling tendency, without the air space ratio or the plasticizing action being significantly changed (see V 3).

EXAMPLE 8 (TABLE II)

A building material is prepared with the additive combination composed of a sulfonated condensation product of naphthalene and formaldehyde, more than 70% consisting of those molecules which have 7 or more naphthalene groups (additive 1), and of additive 2 according to Examples 1 to 4. It is found that the additive 2 enhances the plasticizing action of additive 1, the air space ratio being about the same (see V 4).

EXAMPLE 9 (TABLE II)

A building material is prepared with the additive combination composed of a mixture of 50% of a condensation product of naphthalene, β-naphthalene sulfonic acid and formaldehyde, and 50% of water (additive 1), and of additive 2 according to Examples 1 to 4. It is found that the additive 2 enhances the plasticizing action of the additive 1, the air space ratio being changed only slightly (see V 5).

EXAMPLES 10 to 12 (TABLE III)

A building material is prepared with the additive combination composed of additive 1 and additive 2 according to Examples 1 to 4 and Na-D-gluconate (Examples 10 and 11) or tartaric acid (Example 12) as the additive 3. A synergistic effect with respect to the plasticizing action (see V 2 and Examples 1 to 6) is found. In the building materials according to Examples 10 and 11, the bending tension strength after 28 days is, respectively, 76.3 kp/cm$^2$ and 72.8 kp/cm$^2$ and the compressive strength is 426 and 510 kp/cm$^2$.

EXAMPLES 13 AND 14 (TABLE III)

A building material is prepared with the additive combination composed of additive 1 and additive 2 according to Example 7 and Na-D-gluconate (Example 13) or tartaric acid (Example 14) as the additive 3. Again, a synergistic effect with respect to the plasticizing action (see V 3 and Example 7) is found. In the building material according to Example 13 the bending tension strength after 28 days is 83.3 kp/cm$^2$ and the compressive strength is 583 kp/cm$^2$.

EXAMPLE 15 (TABLE III)

A building material is prepared with the additive combination composed of additive 1 and additive 2 according to Example 8 and Na-D-gluconate as the additive 3. The synergistic effect again can be detected (see V 4 and Example 8).

EXAMPLE 16 (TABLE III)

A building material is prepared with the additive combination composed of additive 1 and additive 2 according to Example 9 and Na-D-gluconate as the additive 3. The synergistic effect again can be detected (see V 5 and Example 9).

COMPARATIVE EXAMPLES V 6 to V 8 (TABLE III)

A building material is prepared with the additive combination composed of additive 1 and additive 2 according to Examples 1 to 4 and various polyhydroxy compounds, not according to the invention, from the sugar group (compounds similar to gluconic acid) as the additive 3. The polyhydroxy compounds, not according to the invention, used are D-glucose (V 6) as a hexose; xylose (V 7) as a pentose and sucrose (V 8) as a disaccharide; in all cases, there is virtually no change, or only a slight change, in the plasticizing action with an increased air space ratio, as compared with a comparable building material without the additive 3 (Example 4).

TABLE I

| Example | Amount added (%), relative to the weight of cement | Slump (cm) | Air space ratio (% by volume) | Bending tension strength (kp/cm²) | Compressive strength (kp/cm²) | Settling tendency |
| --- | --- | --- | --- | --- | --- | --- |
| V1 | — | 15.2 | 3.5 | 75.9 | 404 | moderate |
| V2 | 0.50 | 25.5 | 2.5 | 84.7 | 524 | high |
|    | 0.25 | 16.8 | 3.6 | — | — | high |
| V3 | 1.00 | 24.6 | 2.1 | 92.3 | 663 | medium |
|    | 0.50 | 16.8 | 3.9 | — | — | medium |
| V4 | 1.00 | 21.3 | 6.0 | — | — | moderate |
|    | 0.50 | 20.3 | 4.6 | — | — | moderate |
| V5 | 2.00 | 20.1 | 6.2 | — | — | moderate |
|    | 1.00 | 18.5 | 5.8 | — | — | moderate |

Table II

| Example | Amount of additive (%), relative to the weight of cement | | Slump (cm) | Air space ratio (% by volume) | Settling tendency |
| --- | --- | --- | --- | --- | --- |
|  | Additive 1 | Additive 2 |  |  |  |
| 1 | 0.50 | 0.500 | 25.7 | 3.2 | moderate |
| 2 | 0.25 | 0.500 | 19.3 | 3.9 | moderate |
| 3 | 0.25 | 0.250 | 19.4 | 4.2 | moderate |
| 4 | 0.25 | 0.125 | 19.3 | 4.8 | moderate |
| 5 | 0.25 | 0.500 | 22.0 | 2.8 | moderate |
| 6 | 0.25 | 0.250 | 21.6 | 2.8 | moderate |
| 7 | 0.50 | 0.500 | 17.0 | 3.6 | moderate |
| 8 | 0.50 | 0.125 | 21.1 | 4.4 | moderate |
| 9 | 1.0 | 0.125 | 19.4 | 6.5 | moderate |

TABLE III

| Example | Amount of additive (%), relative to the weight of cement | | | Slump (cm) | Air space ratio (% by volume) | Settling tendency |
| --- | --- | --- | --- | --- | --- | --- |
|  | Additive 1 | Additive 2 | Additive 3 |  |  |  |
| 10 | 0.25 | 0.125 | 0.125 | 26.0 | 3.0 | moderate |
| 11 | 0.25 | 0.125 | 0.075 | 25.3 | 4.0 | moderate |
| 12 | 0.25 | 0.125 | 0.075 | 23.1 | 3.6 | moderate |
| 13 | 0.50 | 0.125 | 0.075 | 24.4 | 3.2 | moderate |
| 14 | 0.50 | 0.125 | 0.050 | 24.4 | 2.9 | moderate |
| 15 | 0.50 | 0.125 | 0.075 | 22.4 | 3.5 | moderate |
| 16 | 1.00 | 0.125 | 0.075 | 20.2 | 5.3 | moderate |
| V6 | 0.25 | 0.125 | 0.060 | 10.7 | 5.9 | moderate |
| V7 | 0.25 | 0.125 | 0.050 | 18.6 | 5.3 | moderate |
| V8 | 0.25 | 0.125 | 0.115 | 19.6 | 5.9 | moderate |

It will be obvious to those skilled in the art that many modifications may be made within the scope of the present invention without departing from the spirit thereof, and the invention includes all such modifications.

What is claimed is:

1. An additive combination for water containing, setting building materials, in particular those of cement, based on about 0.1% by weight to 3.0% by weight of an anionic polyelectrolyte, and including at least about 0.05% by weight to 1.0% by weight of a non-ionic, low-foaming surfactant, all percent by weight values being relative to a binder in the building material.

2. An additive combination as claimed in claim 1 which includes, in addition, at least 0.01% by weight to 0.5% by weight of a polyhydroxy monocarboxylic or polyhydroxy dicarboxylic acid, also relative to a binder in the building material.

3. An additive combination as claimed in claim 1 which includes a surfactant containing a proportion of hydrophobic groups greater than that of hydrophilic groups.

4. An additive combination as claimed in claim 1 which includes a surfactant which is an optionally modified block polymer of propylene oxide and ethylene oxide or an alkylaryl polyglycol ether.

5. An additive combination as claimed in claim 2 which includes, in addition, at least one compound of the general formula

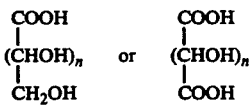

or a salt corresponding thereto, with n = 2 to 5.

6. An additive combination as claimed in claim 2 which includes, in addition, at least one compound selected from the group consisting of D-gluconic acid, heptonic acid, tartaric acid and salts thereof.

7. A process for the plasticizing of water-containing, setting building materials, in particular those of cement, which comprises adding to the building material an additive combination composed of about 0.1% by weight to 3.0% by weight of an anionic polyelectrolyte and at least about 0.05 to 1.0% of a non-ionic, low-foaming surfactant, all percent by weight values being relative to a binder in the building material.

8. A process as claimed in claim 7 in which the additive combination contains, in addition, at least about 0.01% by weight to 0.5% by weight of one polyhydroxy monocarboxylic or polyhydroxy dicarboxylic acid, also relative to a binder in the building material.

* * * * *